(12) United States Patent
Smith et al.

(10) Patent No.: US 7,237,661 B2
(45) Date of Patent: Jul. 3, 2007

(54) INTEGRAL INPUT SHAFT BRAKE AND DISCONNECT APPARATUS

(75) Inventors: Wade A. Smith, Imlay City, MI (US); Troy S. Reinoehl, Ashley, IN (US); Kevin F. Schlosser, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 135 days.

(21) Appl. No.: 10/999,561

(22) Filed: Nov. 30, 2004

(65) Prior Publication Data

US 2006/0113155 A1  Jun. 1, 2006

(51) Int. Cl.
*B60W 10/02* (2006.01)
*B60W 10/10* (2006.01)
*F16D 67/04* (2006.01)

(52) U.S. Cl. .................. 192/3.63; 192/13 R; 192/18 A
(58) Field of Classification Search ..................... None
See application file for complete search history.

(56) References Cited

U.S. PATENT DOCUMENTS

| | | | | |
|---|---|---|---|---|
| 3,540,557 A | * | 11/1970 | Hasselbacher et al. | 192/18 A |
| 3,570,636 A | * | 3/1971 | Franz et al. | 192/3.57 |
| 3,743,070 A | * | 7/1973 | Howard et al. | 192/13 R |
| 3,912,058 A | * | 10/1975 | Parkins | 192/18 A |
| 4,014,420 A | * | 3/1977 | Riese | 192/13 R |
| 4,574,926 A | * | 3/1986 | Bubak | 192/18 A |
| 4,930,081 A | * | 5/1990 | Dunkley et al. | 701/52 |
| 6,539,820 B2 | | 4/2003 | Markyvech | |
| 6,622,836 B2 | | 9/2003 | Otto et al. | |
| 6,659,251 B2 | | 12/2003 | Ohkubo et al. | |
| 6,659,252 B2 | | 12/2003 | Heller | |
| 2003/0186782 A1 | | 10/2003 | Genise | |

\* cited by examiner

*Primary Examiner*—Rodney H. Bonck
(74) *Attorney, Agent, or Firm*—Brooks Kushman P.C.

(57) ABSTRACT

An input shaft brake and disconnect apparatus is provided in a housing between an engine and a transmission. The disconnect apparatus has a first cavity that receives pressurized fluid causing a piston to shift and disconnect an input shaft from a clutch. Pressurized fluid is provided to a second cavity to shift a piston that is associated with a single brake disk or double brake disk that are disposed on one or both sides of an input shaft rotor that is retained on an input shaft. The disconnect apparatus and brake allow for quicker shifting.

4 Claims, 10 Drawing Sheets

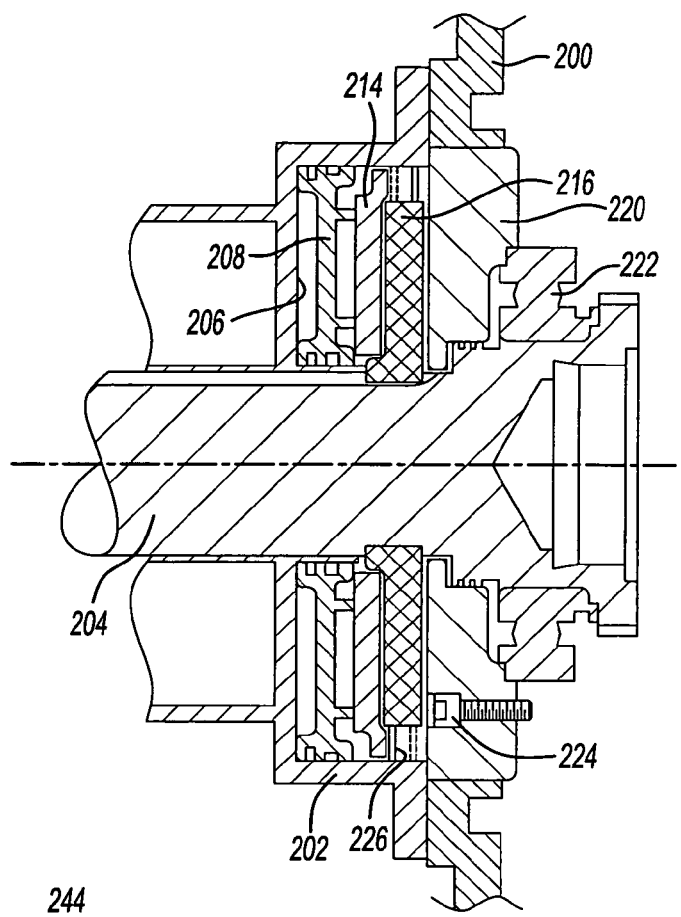
_Fig-8_
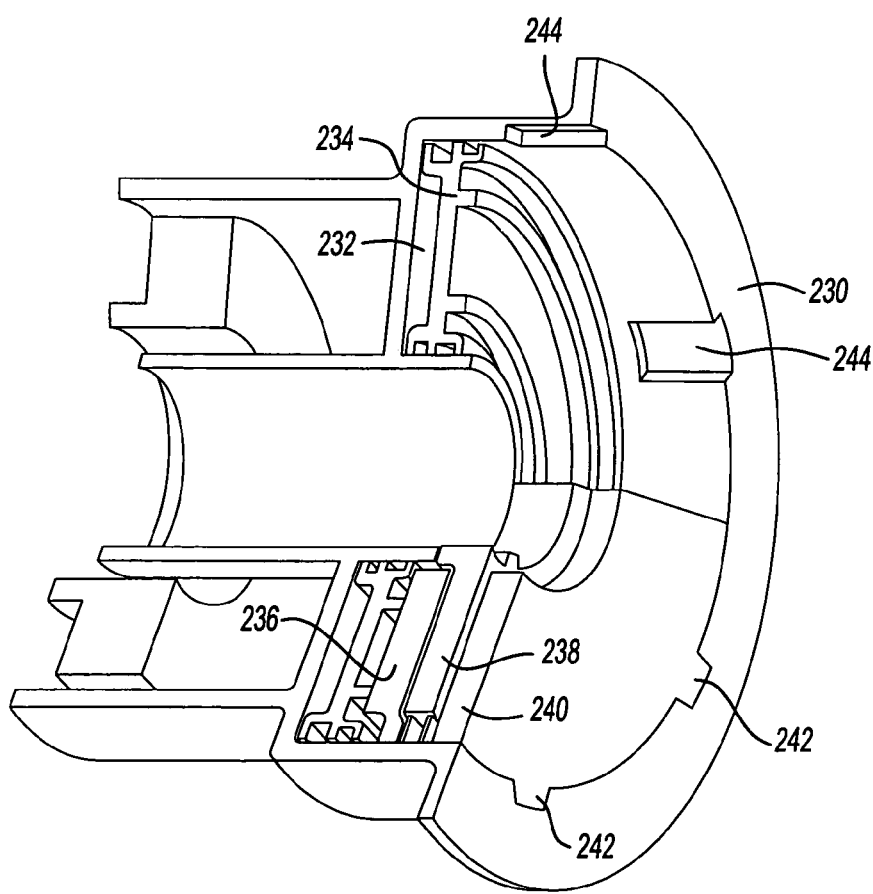
_Fig-9_

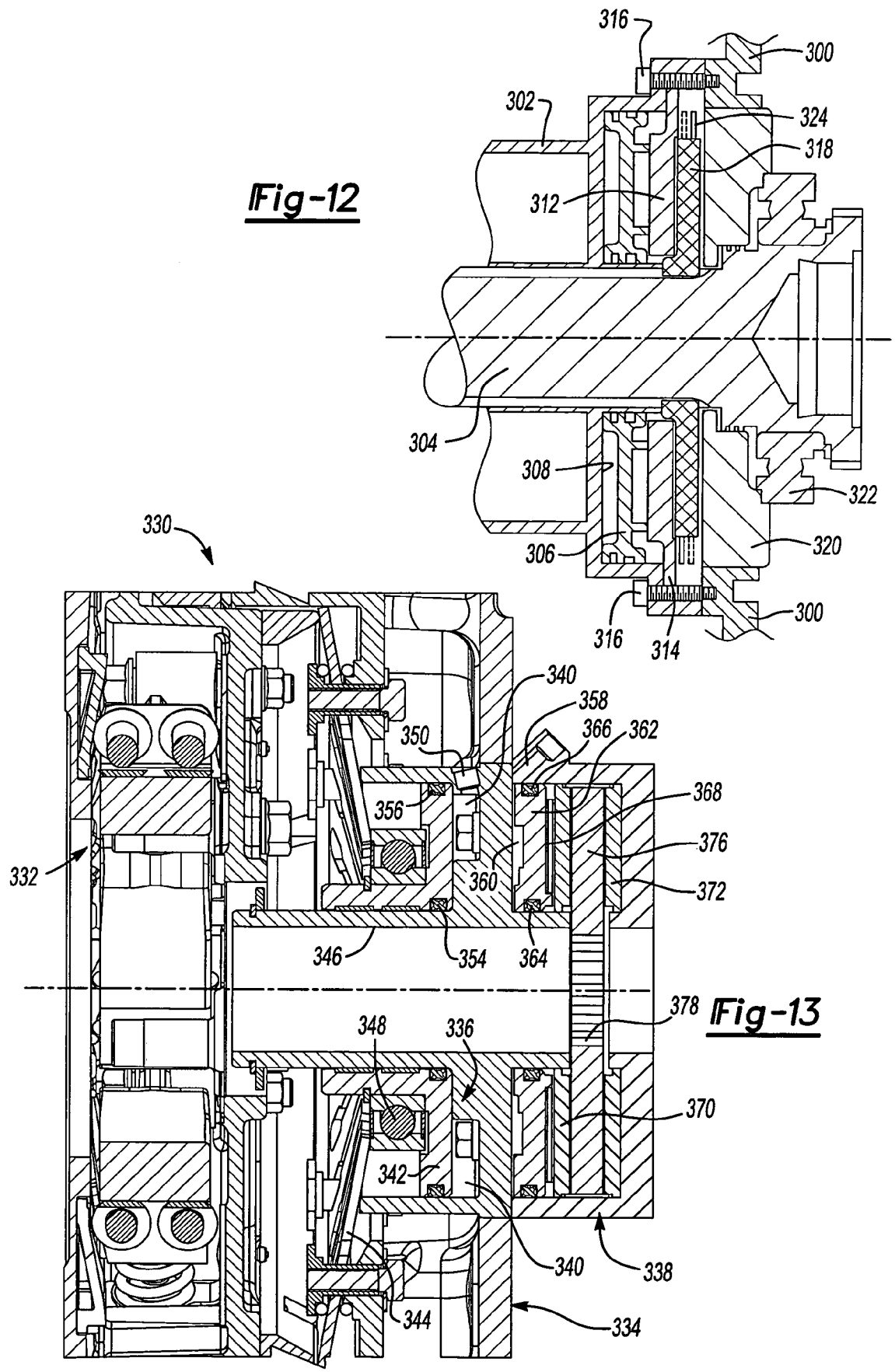

INTEGRAL INPUT SHAFT BRAKE AND DISCONNECT APPARATUS

BACKGROUND OF THE INVENTION

1. Field of the Invention

The present invention relates to a vehicle transmission system that has an input shaft brake and disconnect apparatus disposed between a clutch and a multiple speed gear transmission.

2. Background Art

Vehicles are provided with transmissions that provide multiple gear ratios for different power and speed requirements. Many different types of transmissions have been developed, including manual transmissions, automatic transmissions and automated shift transmissions. Automatic transmissions are generally provided for cars and light trucks that provide fully automatic shifting by means of a complex hydraulic and electronic control system. Manual transmissions are simpler and generally require manual disengagement of a clutch and manual movement of a shift lever to engage different gear ratios. Automated shift manual transmissions have been developed that provide the convenience of an automatic transmission but are shifted by means of X-Y shift control motors that move a shift lever in manual transmissions.

Each of the above-described transmission systems may be provided with a synchronizing system that synchronizes a selected gear with a rotating input shaft. The synchronizing system facilitates smooth shifting without the noise and wear caused by a failure of gears to properly mesh as they are engaged. Prior art automated shift transmissions are coupled to an input shaft without a brake being interposed between the clutch and transmission. Synchronizing systems cause input shaft supported gears and output shaft supported gears to rotate at near synchronous speeds. Synchronizing systems add cost and weight to transmission synchronizing systems. Time is required to synchronize rotation of gears and can delay shifting operations.

One approach to permit more rapid shift performance is to provide an inertia brake that is mounted to a transmission power takeoff location. An inertia brake mounted at a power takeoff location can be used to slow shaft rotation and may allow shifts to be synchronized more rapidly. One disadvantage of power takeoff mounted inertia brakes is that such devices add weight to the transmission that can adversely impact fuel economy. Another disadvantage is that assembling a power takeoff mounted inertia brake to the transmission increases the cost of parts and labor. In addition, mounting the inertia brake to a power takeoff location makes that power takeoff location unavailable for other purposes.

In the design of transmissions, of any type, it is an objective to provide capability to shift more quickly and smoothly. By providing quicker shifts, transmission performance and efficiency may be improved.

In some situations, it may be difficult for an operator to perfectly shift between low ratio gears or when it is necessary to shift for performance. For example, when a vehicle is on a steep grade and loaded, the clutch must be disengaged, gears shifted and clutch re-engaged with precise timing. To assist a driver in making these shifts, transmissions are normally provided with synchronizers. Synchronizers delay shifting and can reduce transmission shift performance in difficult situations.

There is a need for a low cost system for providing quicker shifts by allowing more rapid transmission gear synchronization. The present invention is directed to improving transmission performance and providing quicker shifting capability as summarized below.

SUMMARY OF THE INVENTION

According to one aspect of the present invention, a combination of a vehicle engine, a clutch, a multiple ratio gear transmission, and an integral input shaft brake and disconnect device is provided. The input shaft brake and disconnect device are disposed in at least one housing located between the engine and the transmission. An input shaft is at least partially located within the housing and a rotor is secured to the input shaft. A disk brake plate is grounded to the housing and disposed adjacent to the rotor. A brake piston is axially movable relative to the input shaft and housing. A clutch disconnect apparatus is operably connected to the clutch. A disconnect piston is connected to the clutch disconnect apparatus and is axially movable relative to the input shaft and housing. A first fluid cavity is defined by a first portion of the housing and the disconnect piston. A second fluid cavity is defined by a second portion of the housing and the brake piston. A first fluid port opens into the first fluid cavity through which a fluid is ported under pressure to cause the disconnect piston to be axially shifted to disengage the clutch. A second fluid port opens into the second fluid cavity through which fluid is ported under pressure to cause the brake piston to be axially shifted to apply a braking force to the rotor by the brake plate.

According to other aspects of the invention, the second fluid port may provide fluid flow between the first fluid cavity and the second fluid cavity when the pressure in the first fluid cavity is greater than a threshold level. Fluid may flow between the first cavity and the second cavity depending upon the pressure in the first fluid cavity. The second fluid port may be a bi-directional valve port that ports the fluid from the second fluid cavity to the first fluid cavity when the pressure in the first fluid cavity is less than a second threshold level. Fluid may flow out of the first cavity through the first fluid port when the pressure in the first fluid cavity is less than a second threshold level.

According to other aspects of the present invention, the combination may also include a return spring that operatively engages the brake piston to bias the brake piston against applying a braking force to the rotor and also causing the fluid to flow from the second fluid cavity to the first fluid cavity.

The clutch disconnect apparatus may further include a finger spring for applying pressure to the clutch when the disconnect piston is in a first position. Pressure applied by the finger spring is released when the disconnect piston is shifted to a second position as a result of fluid being ported into the first cavity.

According to another aspect of the present invention, a method of shifting a geared multi-speed transmission is provided. The transmission has a rotating input shaft that may be used to rotate any one of a plurality of different gear sets. The method generally comprises generating a control signal to a fill valve to disengage a clutch that connects an engine to the transmission. The valve is then opened to port a pressurized fluid into a first fluid cavity that is defined by a housing and a clutch disconnect piston. The clutch is shifted from a first clutch position to a second clutch position in which the disconnect position minimizes torque transmitted by the clutch. Another port is opened to provide pressurized fluid to a second fluid cavity defined by the housing and a brake piston. The brake piston is shifted between a first position and a second position. In the second position, a braking force is applied to a rotor that rotates with the rotating shaft. The gear set rotated by the input shaft may then be changed. Fluid is exhausted from the second fluid cavity to allow the brake piston to move from the second brake position to the first brake position. Fluid is also exhausted from the first fluid cavity to allow the clutch disconnect piston to move from the second clutch position to the first clutch position to re-engage the clutch and allow the clutch to transmit torque.

According to other aspects of the method of the invention, the valve that ports fluid to the second cavity may be disposed in the housing to port pressurized fluid between the first fluid cavity and the second fluid cavity. The valve that ports fluid to the second cavity may be a bi-directional valve that allows fluid to flow between the first cavity and the second cavity. When fluid pressure in the first cavity exceeds a first level, it allows fluid to flow from the second cavity to the first cavity. When the pressure in the first cavity drops below a second level that is less than the first level, fluid is allowed to flow from the second fluid cavity to the first fluid cavity. Alternatively, the valve porting fluid to the second cavity may port pressurized fluid directly through the housing independently of the first cavity.

The method may alternatively be described as comprising the first cavity being pressurized to a first level A at which the disconnect piston is shifted. The pressure in the first cavity may be increased to a second level B wherein the pressurized fluid is provided to the second cavity to shift the brake piston and apply a braking force to the rotor. The braking force reduces the speed of rotation of the input shaft from a first speed X to a second speed Y. Upon reducing the speed of rotation of the shaft to the second speed Y, the fluid is exhausted from the first and second cavities reducing the pressure in the second cavity to below level B allowing the brake piston to shift to the first brake position. Further reduction of the pressure in the first cavity to below level A shifts the disconnect piston to its first position. A bi-directional valve may be used to port the pressurized fluid from the first cavity to the second cavity when the fluid pressure in the first cavity is above level A. The bi-directional valve exhausts pressurized fluid from the second cavity to the first cavity when fluid pressure in the first cavity drops below level A.

The above objects and other aspects of the present invention are readily apparent from the following detailed description of the best mode for carrying out the invention when taken in connection with the accompanying drawings.

BRIEF DESCRIPTION OF THE DRAWINGS

FIG. 8 is a fragmentary cross-sectional view of an input shaft brake made according to another alternative embodiment of the present invention;

FIG. 9 is a fragmentary perspective partially cut-away view of another alternative embodiment of the present invention;

FIG. 12 is a fragmentary cross-sectional view of an input shaft brake made according to another alternative embodiment of the present invention;

FIG. 13 is a cross-sectional view of a clutch, a disconnect apparatus and an input shaft brake made in accordance with an alternative embodiment of the present invention;

DETAILED DESCRIPTION OF THE PREFERRED EMBODIMENT(S)

Figure 1:
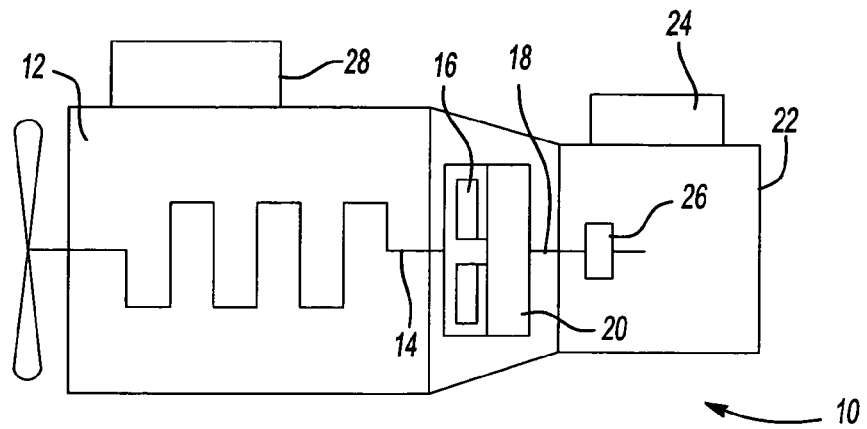
FIG. 1 is a schematic diagram of an engine and a multiple speed geared transmission made according to one embodiment of the present invention.

Referring to FIG. 1, a transmission system 10 for a vehicle engine 12 is schematically illustrated. The engine 12 has a crankshaft 14 that is connected through a clutch 16 to an input shaft 18. An input shaft brake 20 is assembled to the input shaft 18. The input shaft 18 is connected to a multi-speed gear transmission 22 that is controlled by a controller 24. Controller 24 monitors transmission operations and may also monitor engine operations. The controller may also obtain data from other signal sources as is well known in the art. For example, a rotation sensor 26 may be provided to monitor the speed of rotation of the input shaft 18. The controller 24 may also receive data from an engine speed tachometer or the engine controller 28. A wide variety of sensors may be used to provide data to the controller 28.

Figure 2:
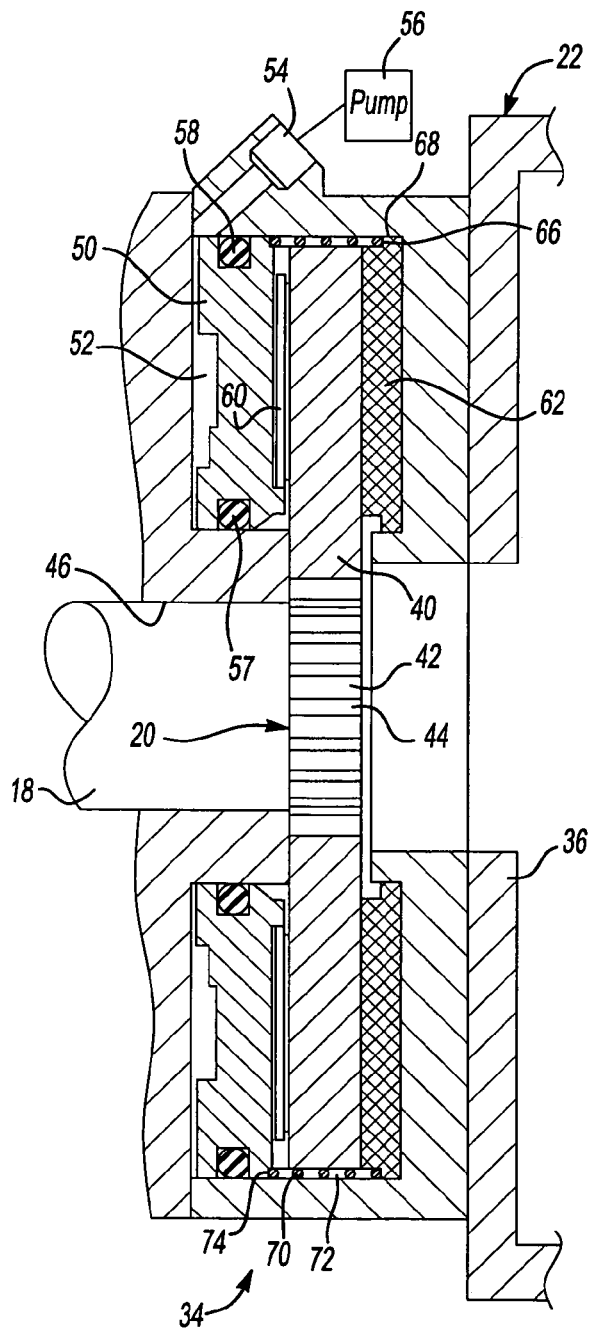
FIG. 2 is a fragmentary cross-sectional view of an input shaft brake made according to one embodiment of the present invention.
Figure 3:
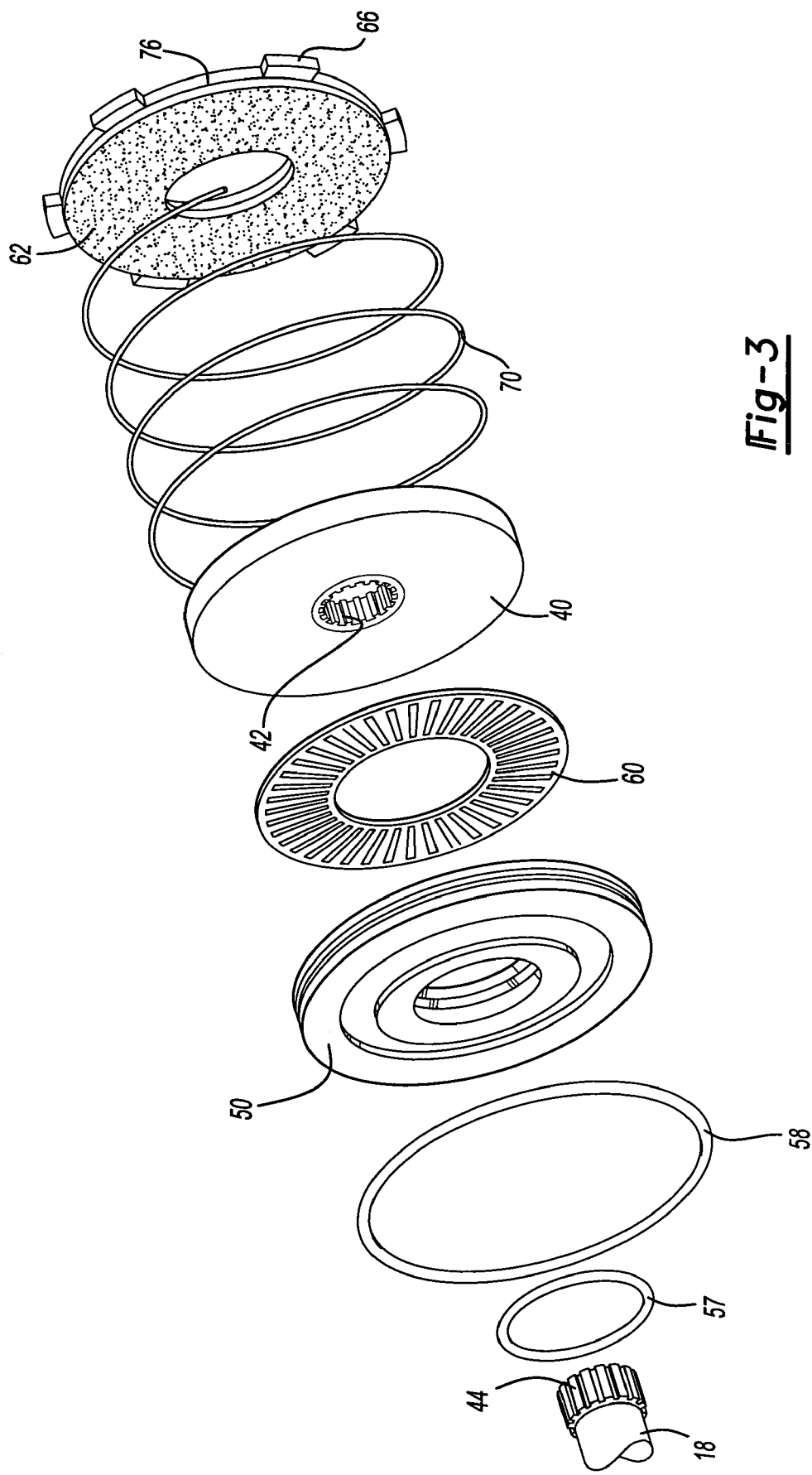
FIG. 3 is a fragmentary exploded perspective view of the input shaft brake as illustrated in FIG. 2.

Referring to FIGS. 2 and 3, a portion of a transmission 22 is shown that is adapted to receive torque from the engine 12 via an input shaft 18. An inertia brake housing 34 encloses an input shaft brake 20 and is either secured to or integrally formed with the transmission housing 36. Input shaft brake 20 has a disk 40, or rotor, having splines 42 formed on its inner diameter that are engaged by and mate with splines 44 formed on the input shaft 18. Input shaft 18 is received within an opening 46 in the inertia brake housing 34.

A brake piston 50 is disposed in a chamber 52 defined within the inertia brake housing 34. A port 54 opening into the chamber 52 is connected to a pressurizing system that is the source of a control fluid, such as a hydraulic pump or air compressor 56. The hydraulic pump or air compressor 56 may be provided with a pressure regulator and is controlled by the transmission controller 24. Control fluid is used to shift the brake piston 50 within the chamber 52 when pressurized fluid is injected into the port 54 under pressure.

The brake piston 50 has an inner O-ring seal 57 and an outer O-ring seal 58 that seal between the piston 50 and the chamber 52 as the brake piston 50 is moved.

A thrust bearing 60 is provided between the brake piston 50 and the input shaft disk 40. The input shaft disk 40 rotates with the input shaft 18 while the brake piston 50 does not rotate.

A brake disk 62 is formed of a friction material and is retained in the inertia brake housing 34 by grounding teeth 66 that are received in recesses 68 formed in the inertia brake housing 34. Alternatively, the brake disk 62 could be formed as a plate that is coated with friction material or it could have a sheet form friction element applied thereto. The brake disk 62 is prevented from rotating by the grounding teeth 66 that are held by the recesses 68.

A return spring 70 is disposed in an annular space 72 defined between the outer diameter of the input shaft disk 50 and the inertia brake housing 34. Return spring 70 exerts a biasing force against the brake piston 50 to bias the brake piston 50 into a disengaged position. The return spring 70 is received in an annular groove 74 formed in the brake piston 50 on one end and on the other end is received in an annular seat 76 formed by the brake disk 62 and inertia brake housing 34.

In operation, when the transmission is to be shifted, it may be advantageous to slow input shaft 18 rotation to improve shift or synchronizer performance. When the transmission controller 24 determines the need for input shaft 18 braking, hydraulic fluid or compressed air may be provided to the port 54. In either case, the fluid pressure applied to the brake piston 50 causes the brake piston 50 to shift toward the input shaft disk 40. The brake piston 50 engages the thrust bearing 60 that in turn engages the input shaft disk 40. Input shaft disk 40 is axially shifted within the inertia brake housing 34. Splines 42 and 44 permit the disk 40 to move axially to a limited extent allowing the input shaft disk 40 to be forced into engagement with brake disk 62. When the input shaft disk 40 engages the brake disk 62, rotation of the disk 40 is slowed as a result of the application of braking force. Brake disk 62 is grounded by means of the grounding teeth 66 to the recesses 68 formed in the inertia brake housing 34.

When the transmission controller 24 determines that sufficient braking force has been applied to the input shaft disk 40, the hydraulic or pneumatic fluid is exhausted through the port 54 as a result of the biasing force applied to the brake piston 50 by the return spring 70. The brake piston 50 shifts axially to disengage the input shaft disk 40 and eliminate the braking force applied to the input shaft disk 40.

Figure 4:
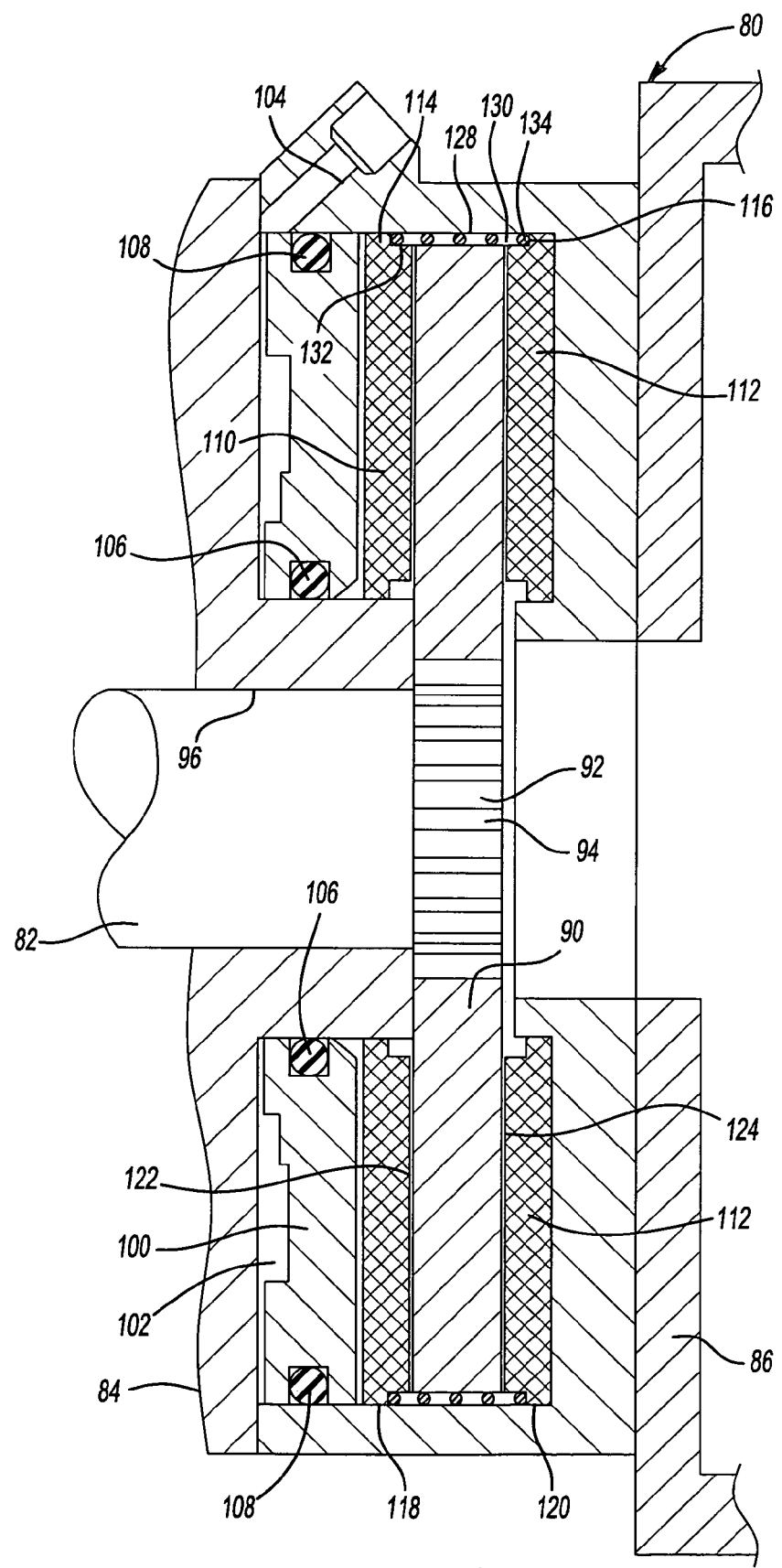
FIG. 4 is a fragmentary cross-sectional view of an input shaft brake made according to one alternative embodiment of the present invention.
Figure 5:
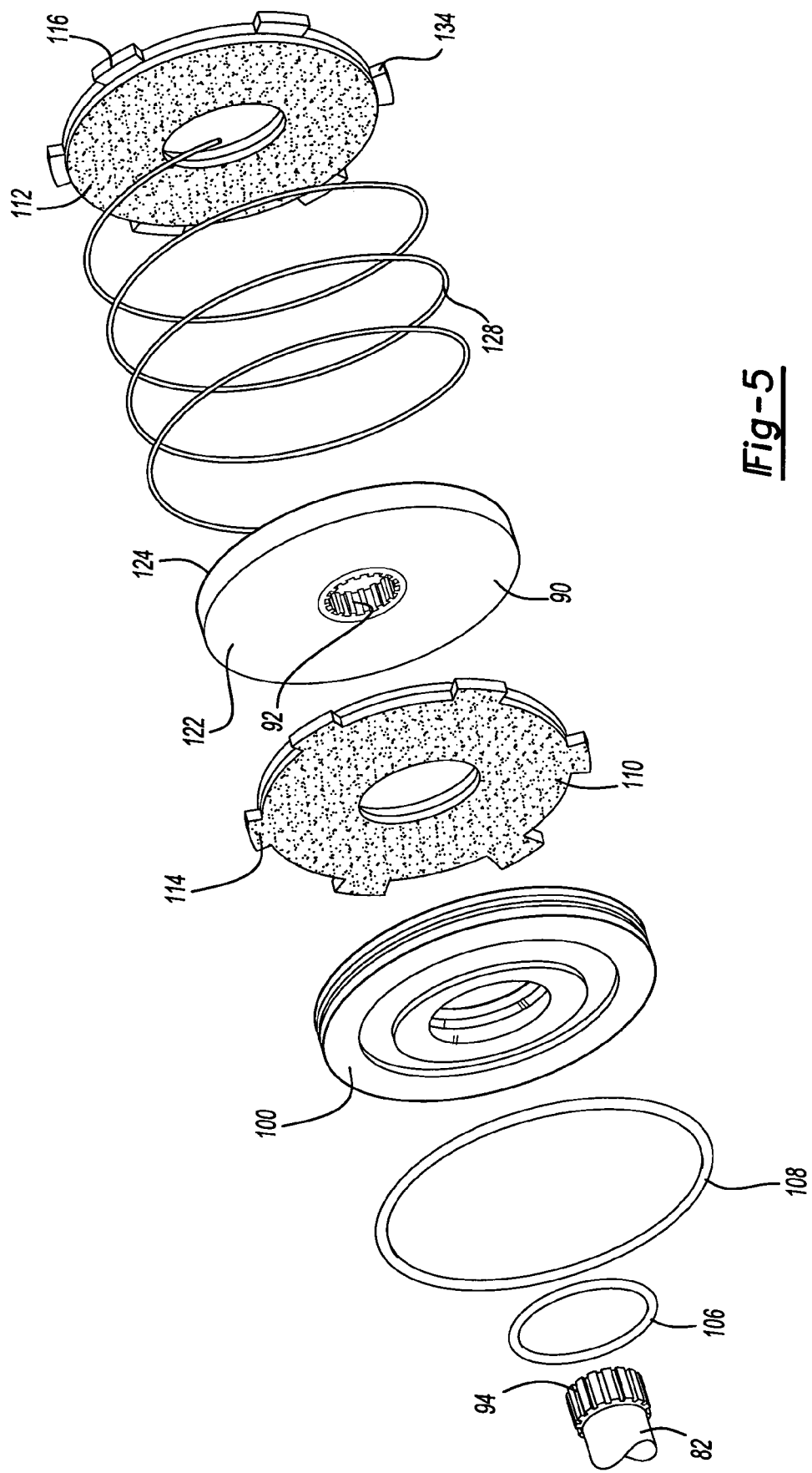
FIG. 5 is a fragmentary exploded perspective view of the input shaft brake illustrated in FIG. 4.

Referring now to FIGS. 4 and 5, an alternative embodiment of a transmission 80 is partially shown with its input shaft 82. The input shaft 82 is received within an inertia brake housing 84 or, alternatively, could be received within a transmission housing 86. An input shaft disk 90 rotates with the input shaft 82. Input shaft disk 90 has a plurality of splines 92 formed on its inner diameter that receive splines 94 formed on the input shaft 82. The input shaft 82 extends through an opening 96 formed in the inertia brake housing 84.

A brake piston 100 is disposed in a chamber 102 formed in the inertia brake housing 84. A port 104 opens into the chamber 102. Port 104 is connected to a source of fluid such as a hydraulic pump or air compressor that are controlled by the transmission controller. The control fluid is used to selectively move the brake piston 100 within the chamber 102.

The brake piston 100 has an inner O-ring seal 106 and an outer O-ring seal 108 that seal between the brake piston 100 and the chamber 102.

First and second brake disks 110 and 112 have first and second sets of grounding teeth 114 and 116 that ground the brake disks 110, 112 to the inertia brake housing 84. Axially relieved recesses 118 are provided in the inertia brake housing 84 for the grounding teeth 114 of the first brake disk 110. The axially relieved recesses 118 allow the first brake disk 110 to move to a limited extent in an axial direction when the brake piston 100 is axially shifted within the chamber 102. When the brake piston 100 is shifted within the chamber 102, first brake disk 110 engages a first side 122 of the input shaft disk 90 causing it to shift axially on the splines 92 and 94 until a second side 124 of the input shaft disk 90 engages the second brake disk 112. In this way, the first and second brake disks 110 and 112 engage opposite sides of the input shaft disk 90 to apply a braking force to the input shaft disk and slow rotation of the input shaft 82.

A return spring 128 is provided in an annular space 130 formed between the outer diameter of the input shaft disk 90 and the inertia brake housing 84. An angular groove 132 in the brake piston 100 receives one end of the return spring 128. The other end of the return spring 128 is received in an annular seat 134 formed in the inertia brake housing 84.

In operation, this alternative embodiment of the input shaft brake of the present invention is engaged during a shift operation as controlled by the transmission controller. When the transmission controller determines that it would be advantageous to apply a braking force to the input shaft 82, compressed air or hydraulic fluid is supplied to the chamber 102 through the port 104. The fluid exerts a force on brake piston 100 causing it to be axially shifted within the chamber 102. Brake piston 100 contacts the first brake disk 110 and shifts it to a limited extent in an axial direction toward the input shaft disk 90. Input shaft disk 90 is shifted into contact with the second brake disk 112. The first and second brake disks 110, 112 apply a braking force to first and second sides 122 and 124 of the input shaft disk 90. When the transmission controller determines that sufficient braking force has been applied to the input shaft disk 90, the control fluid, either compressed air or hydraulic fluid, is exhausted through the port 104 as a result of the biasing force applied by the return spring 128 to the brake piston 100. When the brake piston 100 is shifted by the spring 128, the first and second brake disks 110, 112 cease applying brake pressure to the input shaft disk 90.

FIGS. 6 through 12 provide additional alternative embodiments of the invention that operate in a manner similar to the previously described embodiments. The following embodiments focus on different anti-rotation structures and combinations of braking elements that may be implemented within the spirit and scope of the invention. Other combinations are possible and the invention should not be limited to any approach.

Figure 6:
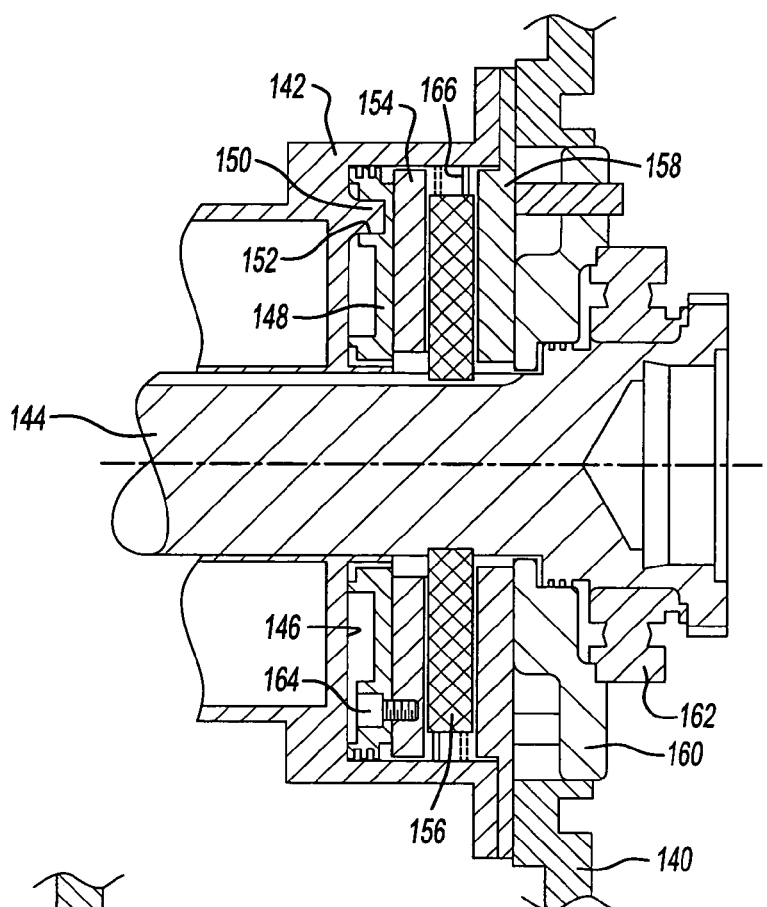
FIG. 6 is a fragmentary cross-sectional view of an input shaft brake made according to another alternative embodiment of the present invention.

Referring to FIG. 6, an alternative embodiment of the present invention is shown. A portion of a transmission housing 140 is shown in conjunction with a portion of an inertia brake housing 142. An input shaft 144 extends through the inertia brake housing 142 into the transmission housing 140. The inertia brake housing 142 defines a chamber 146 in which a piston 148 is contained for a limited degree of axial shifting relative to the input shaft 144. The piston 148 is prevented from axial rotation by bosses 150 that are integrally formed on the inertia brake housing 142 to extend into the chamber 146. The bosses 150 are received within receptacles 152 formed in the piston 148. The piston 148 is axially shiftable to engage a plate 154 which in turn engages a rotor 156 that is formed of friction material and may be a powder metal disk having friction material disposed in the matrix of the disk. A plate 158 is provided on the opposite side of the rotor 156 from the plate 154. When the piston 148 is shifted by hydraulic or pneumatic pressure described above with regard to the embodiments of FIGS. 1–5, the piston 148 shifts axially to cause the plate 154 to engage the rotor 156 that in turn engages the plate 158. Plate 158 is held against rotation by the inertia brake housing 142 that traps the plate 158 against the transmission housing 140. A bearing cap 160 is mounted to the transmission housing 140 that also engages a part of an antifriction bearing 162. Another part of the antifriction bearing 162 is secured to the input shaft 144. The input shaft 144 rotates with the rotor 156 and is supported within the bearing cap 160 by the antifriction bearing 162. The piston 148, plate 154, plate 158, and bearing cap 160 are non-rotatably attached between the transmission housing 140 and inertia brake housing 142. A fastener 164 may secure the piston 148 to the plate 154.

Figure 7:
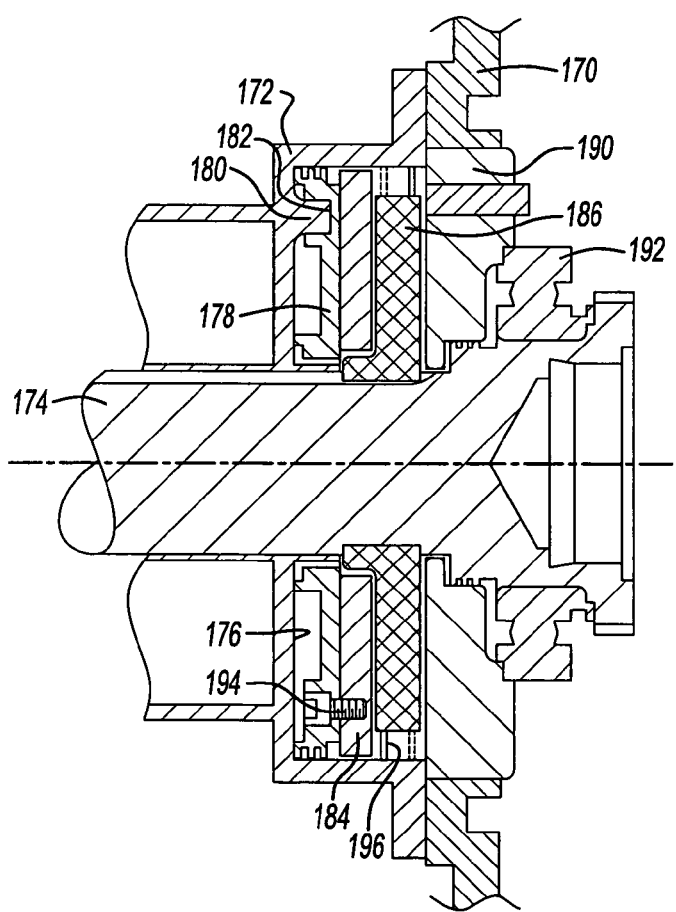
FIG. 7 is a fragmentary cross-sectional view of an input shaft brake made according to another alternative embodiment of the present invention.

Referring to FIG. 7, another embodiment of the present invention is shown in which the transmission housing 170 and inertia brake housing 172 are assembled as previously described. An input shaft 174 extends through the inertia brake housing 172 and into transmission housing 170. The inertia brake housing 172 defines a chamber 176 in which a piston 178 is mounted for limited axial movement. The piston 178 is secured to a plurality of bosses 180 performed on the inertia brake housing 172. The bosses 180 are received within receptacles 182 formed on one side of the piston 178. A plate 184 is assembled around the input shaft 174 with a friction disk or rotor 186 and a bearing cap 190. The plate 184 is axially shifted by movement of the piston 178 against the plate 184 causing it to engage the rotor 186 that in turn is pressed against the bearing cap 190. A fastener 194 secures the piston 178 to the plate 184. The piston is prevented from rotation by the bosses 180 while the plate is held against rotation by the piston 178 which is connected to the plate by the fastener 194.

A wave spring 196 is provided radially outboard of the rotor 186. The wave spring 196 holds the plate 184 away from the bearing cap 190 so that normally, when no fluid pressure is applied to the piston 178, the plate 184 is held away from the rotor 186, and is also separated from the bearing cap 190.

Referring to FIG. 8, another alternative embodiment of the invention is shown in which a transmission housing 200 and inertia brake housing 202 are fragmentarily illustrated in conjunction with a portion of an input shaft 204 that extends through the inertia brake housing 202 and into the transmission housing 200. A chamber 206 is defined in the inertia brake housing 202. A piston 208 is disposed in the chamber 206. The piston 208 is axially shiftable to engage a plate 214 that is also axially shiftable relative to a friction disk 216. Plate 214 is grounded to the inertia brake housing 202 by teeth or splines (not shown) for preventing rotation. The friction disk 216 is assembled for rotation to the input shaft 204 and is axially shiftable to a limited extent so that it may engage bearing cap 220. Bearing cap 220 is stationary and is mounted in the transmission housing 200. A friction bearing 222 is provided between the bearing cap 220 and input shaft 204 to facilitate rotation of the input shaft 204 within the transmission housing 200 and inertia brake housing 202. A fastener 224 is provided to secure the bearing cap 220 to the transmission housing 200 and thereby prevent rotation of the bearing cap 220 with the input shaft 204. A wave spring 226 is provided radially outboard of the rotor or friction disk 216. The wave spring exerts a force on the plate 214 and bearing cap 220 to hold them apart and thereby permit the rotor 216 and the input shaft 204 to rotate freely whenever a pneumatic or hydraulic pressure is removed from the piston 208.

Referring to FIG. 9, an improved inertia brake housing 230 is shown that has a chamber 232 in which a piston 234 is received for limited axial movement. A front plate 236 is mounted concentrically with the piston 234 within the chamber 232. The front plate 236 is adapted to axially engage friction disk 238 when the piston 234 is axially shifted causing the front plate 236 and a rear plate 240 to engage opposite sides of the friction disk 238. The front plate 236 has teeth or splines (not shown) for preventing rotation. The rear plate 240 is prevented from rotating by the engagement of ribs 242, or grounding teeth, in corresponding slots 244 formed in the inertia brake housing 230. The slots 244 are elongated and may also receive ribs or teeth (not shown) that are formed in the outer periphery of the front plate 236. Ribs 242 prevent the rear plate 240 from rotating.

Figure 10:
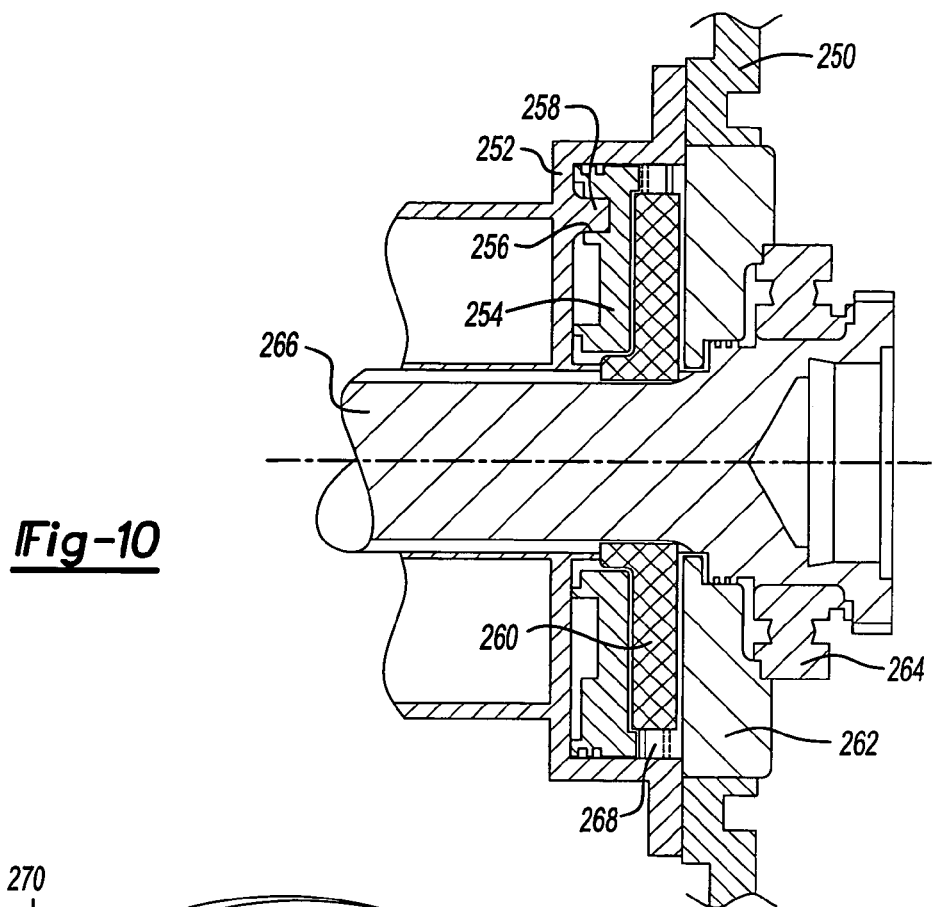
FIG. 10 is a fragmentary cross-sectional view of an input shaft brake made according to another alternative embodiment of the present invention.

Referring to FIG. 10, the transmission housing 250 and inertia brake housing 252 are shown assembled together with a piston 254 axially shiftably disposed within the inertia brake housing 252. Receptacles 256 formed in the piston 254 are adapted to receive bosses 258 that may be integrally formed in the inertia brake housing 252 for preventing rotation while allowing limited axial movement. The piston 254 in the illustrated embodiment directly engages a friction disk or rotor 260 that in turn engages a bearing cap 262. The piston 254 is shifted by the application of hydraulic or pneumatic pressure on the side of the piston 254 opposite the rotor 260. The rotor 260 is preferably formed of friction material embedded in a powder metal. The bearing cap 262 is retained within the transmission housing 250 and supports an outer race of the bearing 264. Inner race of the bearing 264 is secured to the input shaft 266 so that the input shaft 266 may rotate within the bearing cap 262 except for when the input shaft break is engaged. A wave spring 268 is assembled in the inertia brake housing 252 outboard of the rotor 260. The wave spring 268 functions to hold the piston 254 and bearing cap 262 apart from the rotor 260.

Figure 11:
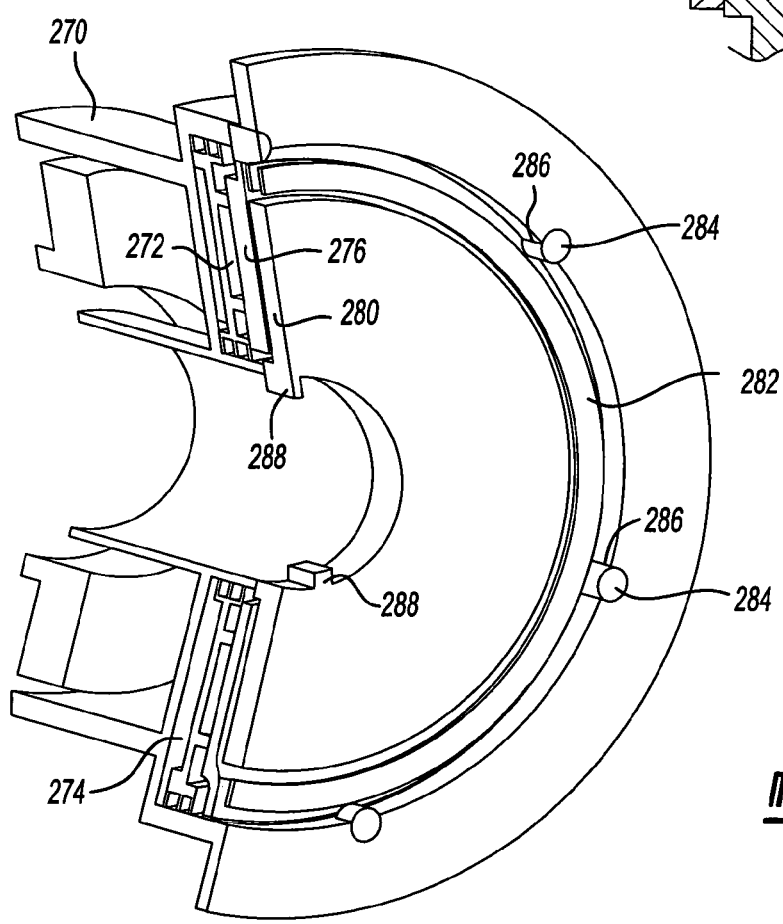
FIG. 11 is a fragmentary perspective partially cut-away view of another alternative embodiment of the present invention.

Referring to FIG. 11, an inertia brake housing 270 is shown for an alternative embodiment of the present invention. The inertia brake housing 270 encloses a piston 272 that is shiftable within a chamber 274 defined by the inertia brake housing 270. A plate 276 is mounted for limited axial shifting within the inertia brake housing 270. The plate 276 may be shifted when hydraulic or pneumatic pressure is applied to the piston 272 to cause the plate 276 to engage a rotor 280. Rotor 280 includes friction material and is preferably formed by a powder metal forming process. A wave spring 282 is assembled to the inertia brake housing 270 to apply a return force to the plate 276. Anti-rotation dowels 284 may be provided in bores 286 that are spaced around the inertia brake housing 270. The anti-rotation dowels 284 prevent rotation of the plate 276 while allowing axial movement. The inner diameter of the rotor 280 is provided with keys 288 that are used to secure the rotor 280 to an input shaft (not shown) as previously described with reference to the preceding embodiments.

Referring to FIG. 12, a transmission housing 300 is shown in conjunction with an inertia brake housing 302 and input shaft 304. The input shaft 304 extends through the inertia brake housing 302 and into the transmission housing 300. A piston 306 is provided within a chamber 308 defined by the inertia brake housing 302. A plate 312 is engaged by the piston 306 that causes the plate 312 to be shifted when hydraulic or pneumatic pressure is applied to the piston 306. The plate 312 is prevented from rotating by circumferentially spaced notches in an outer edge flange 314 that allow the plate 312 to slide axially on shoulder fasteners 316. When pressure is applied by the piston 306, the plate 312 is permitted to shift axially to engage a rotor 318 that is made of friction material. The rotor 318 also shifts axially to engage a bearing cap 320. A braking force is developed between the plate 312, rotor 318 and bearing cap 320 when pressure is applied by the piston 306. The bearing cap 320 is secured to the transmission housing 300 and also retains the outer race to the bearing 322. Bearing 322 supports on its inner race the input shaft 304 for rotation within the transmission housing 300 and inertia brake housing 302. A wave spring 324 exerts an outward force between the plate 312 and bearing cap 320 causing the plate 312 and bearing cap 322 to release the rotor 318 when no braking force is applied to the rotor 318 by the piston 306.

Referring to FIG. 13, one embodiment of an integral input shaft brake and disconnect apparatus 330 is illustrated. A clutch 332 of conventional design is provided at one end of the integral input shaft brake and disconnect apparatus 330. Integral apparatus 330 has a housing 334 that is made up of a disconnect apparatus portion 336 and a brake portion 338. The disconnect apparatus portion 336 defines a disconnect piston cavity 340 in which a disconnect piston 342 is disposed for axial movement. The disconnect piston 342 is shiftable between first and second positions to release and apply a finger spring 344. The disconnect piston 342 and finger spring 344 are secured to an input shaft sleeve 346 in conjunction with an anti-friction bearing 348.

A first fluid port 350 is provided in the disconnect apparatus portion 336 of the housing 334. Pressurized fluid is provided through the first fluid port 350 to the disconnect piston cavity 340. An inner seal 354 and outer seal 356 are provided on the inner and outer diameters of the disconnect piston 342 to form a seal between the disconnect piston 342 and the disconnect piston cavity 340.

A second fluid port 358 is provided to the brake portion 338 of the housing 334. The second fluid port 358 opens into a brake piston cavity 360 in which a brake piston 362 is disposed for axial movement along the input shaft sleeve 346. An inner seal 364 and outer seal 366 seal the inner and outer diameters of the brake piston 362 to form a seal between the brake piston 362 and the brake piston cavity 360. A thrust bearing 368 is provided between the brake piston 362 and a first brake disk 370. A second brake disk 372 is provided on the opposite side of a rotor 376. The rotor 376 is secured to an input shaft (not shown) by means of a plurality of teeth 378 that engage complementary teeth on the input shaft.

In operation, when it is desired to shift a multiple speed gear transmission, a pressurized fluid such as hydraulic fluid or compressed air is provided through the first fluid port 350 to cause the disconnect piston cavity 340 to expand from the engaged position as shown in FIG. 13 to a position wherein the finger spring 344 is released as a result of movement of the disconnect piston 342 towards the clutch 332. Depending upon the transmission control strategy, fluid may be provided through the second fluid port 358 either simultaneously with or slightly after the injection of fluid through the first fluid port 350. Pressurized fluid is provided through the second fluid port to the brake piston cavity 360 that causes the brake piston 362 to shift from the position shown in FIG. 13 which is the release position to an engaged position. The brake piston 362 in the engaged position is shifted toward the first brake disk 370 that shifts axially to engage the rotor 376 that also shifts to engage the second brake disk 372. First and second brake disks 370 and 372 apply a braking force to opposite sides of the rotor 376 to slow the rotation of the input shaft.

At this point, the disconnect apparatus has reduced the application of torque while the braking force applied by the brake disks 370, 372 reduces the speed of rotation of the rotor 376 and the input shaft. The shift mechanism of the geared multi-speed transmission may then be shifted to a different gear ratio. The advantage of this system is that synchronization may be accomplished more quickly as a result of the disconnect and brake functions provided by integral input shaft brake and disconnect apparatus 330.

After shifting, the pressurized fluid may be exhausted from the first fluid port 350 and the second fluid port 358. The brake piston 362 may then shift back to the position shown in FIG. 13 releasing the braking force applied by the first and second brake disks 370, 372 to the rotor 376. At substantially the same time, the disconnect piston 342 shifts back to the position shown in FIG. 13 releasing the finger spring 344 allowing the clutch to again begin transmitting torque to the input shaft.

Figure 14:
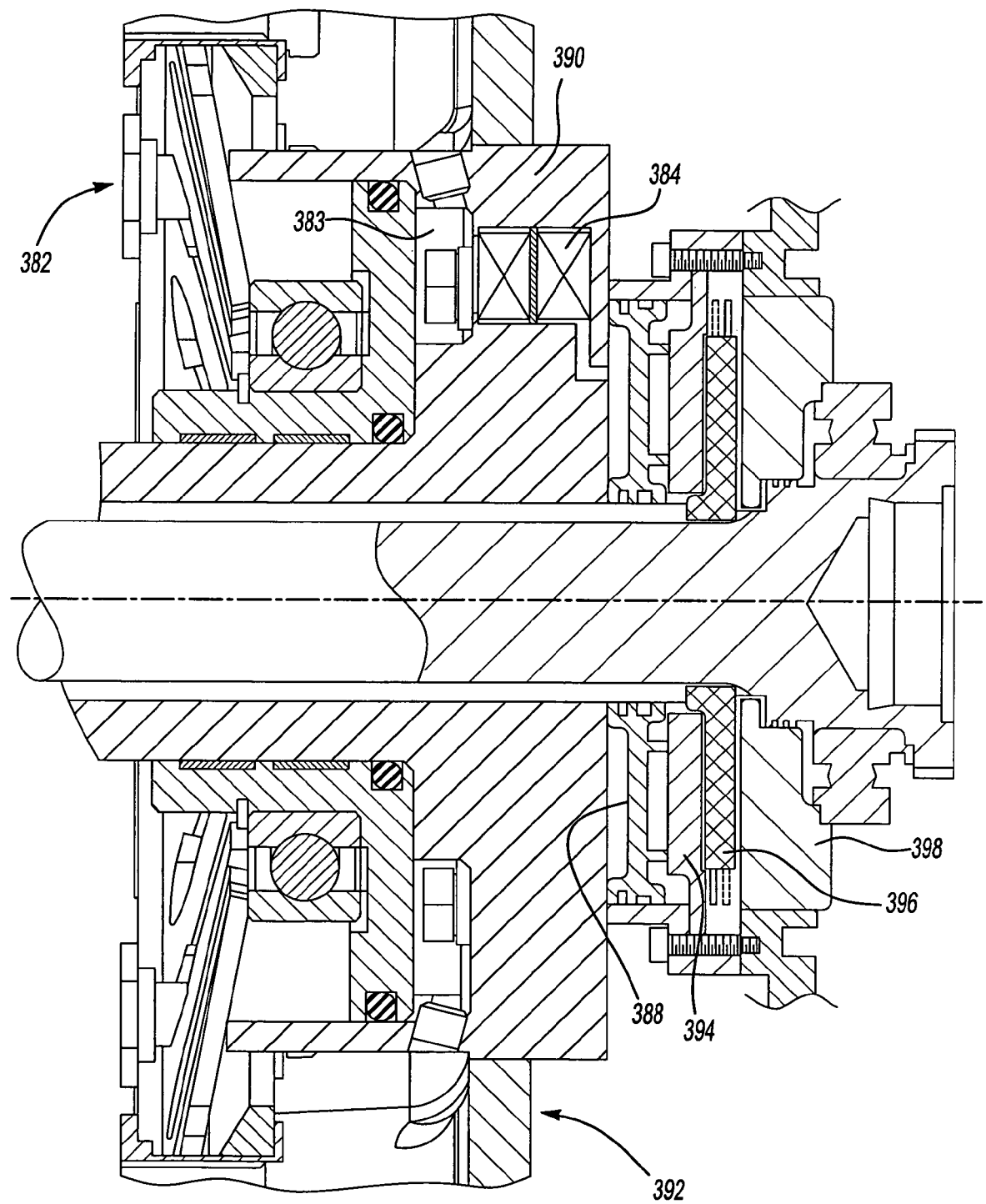
FIG. 14 is a cross-sectional view of a disconnect apparatus and an input shaft brake made in accordance with an alternative embodiment of the present invention.

Referring to FIG. 14, a bi-directional valve embodiment 382 is shown in conjunction with an input shaft brake made in accordance with the input shaft brake illustrated in FIG. 12. The description of the embodiment of the input shaft brake provided above is not repeated in the interest of brevity. It should also be understood that any of the input shaft brakes described with reference to FIGS. 1–12 could be used with any disclosed disconnect apparatus. In the bi-directional valve embodiment 382, a fluid port 383 is in fluid flow communication with a bi-directional valve 384 is provided between the disconnect piston cavity 386 and brake piston cavity 388. A wall 390 in a housing 392 divides the disconnect piston cavity 386 from the brake piston cavity 388. The bi-directional valve 384 allows fluid to flow between the disconnect piston cavity 386 and brake piston cavity 388 depending upon the pressure inside the disconnect piston cavity 386 and brake piston cavity 388.

A brake plate 394, as described above in connection with FIG. 12, is shifted when fluid pressure is provided in a brake piston cavity 388 to cause the brake plate 394 to engage a rotor 396 that is formed of a friction material. The rotor 396 is shifted into engagement with an end cap 398. The brake plate 394 and end cap 398 engage opposite sides of the rotor 396 to apply a braking force to the rotor and, in turn, to the input shaft.

Operation of the bi-directional valve embodiment 382 is substantially similar to the embodiment of FIG. 13 except that the pressurized fluid is first ported into the disconnect piston cavity 386 until a first threshold level is exceeded wherein the bi-directional valve ports fluid from the disconnect piston cavity 386 to the brake piston cavity 388. After the shift operation has been completed, the pressurized fluid is evacuated from disconnect piston cavity 386 through the bi-directional valve 384. The reduction in pressure and the disconnect piston cavity 386 allows the bi-directional valve 384 to open allowing fluid to be exhausted from the brake piston cavity 388 through the bi-directional valve 384 and into the disconnect piston cavity 386.

Figure 15:
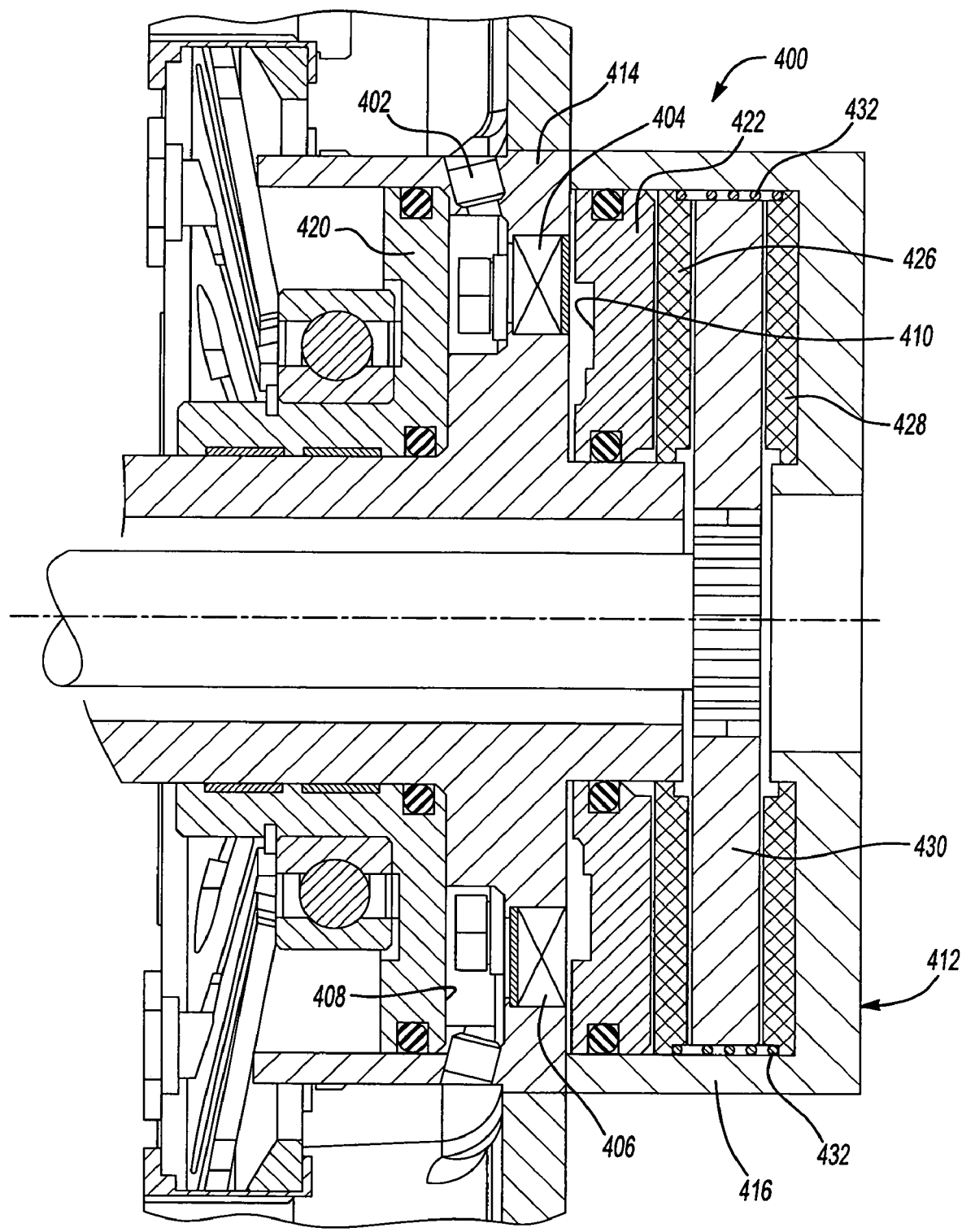
FIG. 15 is a cross-sectional view of a disconnect apparatus and an input shaft brake made in accordance with an alternative embodiment of the present invention.

Referring to FIG. 15, a one-way valve embodiment 400 is illustrated in which a fluid port 402 provides pressurized fluid to the system. This embodiment differs from the embodiments of FIGS. 13 and 14 in that a fill valve 404 and exhaust valve 406 are provided between the disk piston cavity 408 and brake piston cavity 410. The disk piston cavity 408 and brake piston cavity 410 are defined by a housing 412 having a disconnect piston portion 414 and brake piston portion 416. The brake piston portion 416 is substantially similar to the input shaft brake disclosed with reference to FIGS. 4 and 5 above. For brevity, details of the operation of the input shaft brake will not be repeated.

A disconnect piston 420 is provided in the disconnect piston portion 414 of the housing 412 to define the disconnect piston cavity 408. A brake piston 422 disposed in the brake piston portion 416 of the housing 412 partially defines the brake piston cavity 410.

In operation, pressurized fluid is provided through the fluid port 402 to the disconnect piston cavity 408 to cause the disconnect piston 420 to flex a finger spring as previously described with reference to FIGS. 13 and 14. When a predetermined pressure level is reached in the disconnect piston cavity 408, the fill valve 404 opens allowing pressurized fluid to flow into the brake piston cavity 410. The brake piston 422 shifts causing the first brake plate 426 and second brake plate 428 to engage the rotor 430 applying a braking force to the rotor 430 and the input shaft to which it is secured. The multi-speed gear transmission may then be shifted more rapidly and precisely.

After shifting, the pressurized fluid is exhausted from the brake piston cavity 410 through exhaust valve 406 and into the disconnect piston cavity 408. The fluid then flows through the fluid port 402 allowing the disconnect piston cavity 408 to contract by the movement of the disconnect piston 420. A return spring 432 applies a force to the first and second brake plates 426 and 428 biasing them against application of braking force to the rotor 430. The first and second brake plates 426 and 428 are preferably formed of a sintered friction material and are grounded to the housing 412 by means of structural engagement with the housing 412 by tabs and grooves or other anti-rotation devices that permit limited axial movement of the plates 426 and 428.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of shifting a geared multi-speed transmission having a rotating input shaft that is adapted to rotate any one of a plurality of different gear sets, comprising:
    generating a control signal to a fill valve to disengage a clutch that connects an engine to the transmission;
    opening the fill valve to port a pressurized hydraulic fluid into a first fluid cavity that is defined by a housing and a clutch disconnect piston;
    shifting the clutch from a first clutch position to a second clutch position in which the clutch disconnect piston minimizes torque transmitted by the clutch;
    opening a valve to port the pressurized hydraulic fluid into a second fluid cavity that is defined by a housing and a brake piston;
    shifting the brake piston from a first brake position in which no braking force is applied to a rotor that rotates with the rotating input shaft to a second brake position in which a braking force is applied to the rotor;
    changing the gear set rotated by the input shaft;
    exhausting fluid from the second fluid cavity to allow the brake piston to move from the second brake position to the first brake position; and
    exhausting fluid from the first fluid cavity to allow the clutch disconnect piston to move from the second clutch position to the first clutch position to re-engage the clutch and allow the clutch to transmit torque, wherein the valve porting fluid to the second fluid cavity ports pressurized fluid directly through the housing independently of the first fluid cavity.

2. The method of claim 1 wherein the first fluid cavity is pressurized to a first level A at which the clutch disconnect piston is shifted, and wherein the pressure in the first fluid cavity is increased to a second level B and pressure is also provided to the second fluid cavity and the brake piston is shifted to apply a braking force to the rotor to reduce the speed of rotation of the input shaft from a first speed X to a second speed Y.

3. The method of claim 2 wherein upon reducing the speed of rotation of the shaft to Y, the fluid is exhausted from the first and second fluid cavities reducing the pressure in the second fluid cavity to below level B allowing the brake piston to shift to the first brake position and reducing the pressure in the first fluid cavity to below level A to shift the clutch to the first clutch position.

4. The method of claim 3 further comprising a bi-directional valve that ports pressurized fluid from the first fluid cavity to the second fluid cavity when the fluid pressure in the first fluid cavity is above level A and exhausts pressurized fluid from the second fluid cavity to the first fluid cavity when the fluid pressure in the first fluid cavity is below level A.

* * * * *